Patented Dec. 21, 1943

2,337,336

UNITED STATES PATENT OFFICE 2,337,336

CHEMICAL CONDENSATION PRODUCT

Wilbert B. McCluer and Ralph W. Hufferd, Bradford, Pa., assignors to Kendall Refining Company, Bradford, Pa., a corporation of Pennsylvania No Drawing. Application August 3, 1940, Serial No. 351,179

3 Claims. (Cl. 196—149)

This invention relates to new and novel chemical condensation products derived from paraffin base petroleum oils and to processes for their production.

More specifically, the present invention contemplates the production of materials in the form of chemical condensation products derived directly from paraffin base petroleum fractions which have undergone no thermal decomposition or chemical change other than that occasioned by ordinary fractional or vacuum distillation.

The condensation products of the present invention are virtually free from asphaltenes and are highly advantageous in many commercial applications, such as, for example, in the production of blended rubber compositions, adhesives, varnishes, plasticizers, insulation materials, coatings, impregnating agents, and the like.

The source materials from which the novel condensation products are produced constitute naturally contained high molecular weight viscous materials that have been removed from a paraffin base petroleum oil product derived from a crude oil containing not substantially in excess of 0.2% asphaltic-like constituents (Holde method) by precipitation from a warm solution of said paraffin base product in a hydrocarbon solvent which is gaseous at normal temperature and which contains from 2 to 4 carbon atoms per molecule, the warm solution being at a temperature above 77° F., and the solvent to oil ratio being above approximately 6 to 1.

In accordance with the present invention such viscous materials as are susceptible of precipitation from such warm hydrocarbon solutions of a paraffin base oil below the critical temperature of the solvent, are chemically condensed in the presence of air to produce high molecular weight condensation products. The condensation products as thus produced are characterized in that they are over 98% soluble in 88° Baumé petroleum naphtha having a specific gravity of 0.65, 85% of which boils from 95 to 150° F. and which has been treated with $H_2SO_4$ to remove aromatics; they have a lower iodine number than do the precipitated natural viscous materials from which they are condensed, and thus have an increased ratio of carbon atoms per double bond. They also have a higher molecular weight than do the source materials from which they are condensed and possess other physical properties which will be hereinafter more specifically set forth.

Inasmuch as these condensation products are virtually completely soluble in the naphtha fractions above indicated, it is to be observed that they are practically free from asphaltenes.

The mechanism of the chemical condensation of the complex natural viscous materials precipitated from warm hydrocarbon solutions of the paraffin base oils is not fully understood, but is believed to be induced by the presence of air due to oxygen being taken up by certain of the molecules after which molecules are condensed with a splitting off of water to yield a higher molecular weight chemically condensed product. These products may, for convenience, be termed "polymers," but it is to be understood that such designation is not intended to signify that they have resulted wholly from the union of like molecular structures.

The specific nature of the condensation products will, of course, vary and be dependent upon the source materials, i. e., the natural viscous precipitates separated from the paraffin base oils by treatment with warm hydrocarbon precipitants, and the conditions under which these materials have been obtained. These precipitates are to be distinguished from the waxes separated by chilling a hydrocarbon solution of a wax bearing paraffin base fraction, although it will be appreciated that in a normal dewaxing operation some high molecular weight naturally contained viscous materials are separated out with the wax. These may be recovered by retreatment of the wax with a warm hydrocarbon solvent and precipitating such viscous materials therefrom. The highly viscous materials thus derived from the wax are also within the broad contemplation of source materials for the production of condensation products of the present invention.

Before discussing the chemical condensation products, it will be desirable to briefly review the treatment that results in the production of such source materials. While reference will be made more particularly to the use of propane in obtaining the source materials of the present invention, it is to be understood that the other above-mentioned hydrocarbon precipitants, e. g., normally gaseous hydrocarbons of from two to four carbon atoms, may likewise be used, and that propane is referred to as the preferred embodiment of the invention.

An exemplification of a preferred procedure for obtaining illustrative source materials for chemical condensation in accordance with the invention is as follows—

A so-called "cylinder stock" is charged to propane dewaxing and precipitating operations although any normal or vacuum distillation residual stock from a paraffin base crude can be so charged. The specific character of the charge will depend somewhat on the viscosity and pour point of the ultimately desired oil product of the propane treatment. For example, if it is the purpose of the propane treatment to obtain a so-called "bright stock" having a S. S. U. viscosity of 150 at 210° F. a cylinder stock charging material will have approximately the following specifications:

| | | |
|---|---|---|
| Viscosity at 210° F | S. S. U | 175 |
| Optical density (color) | | 2800 |
| A. P. I. gravity | | 25.6 |
| Conradson carbon residue | Percent | 2.6 |
| Flash (Cleveland open cup) | °F | 565 |

Where a bright stock having a viscosity at 210° F. of 120 S. S. U. and a zero pour point is the desired oil product of the propane treatment, the cylinder stock charge will have approximately the following specifications:

| | | |
|---|---|---|
| Viscosity at 210° F | S. S. U | 165 |
| Optical density (color) | | 2700 |
| A. P. I. gravity | | 25.8 |
| Conradson carbon residue | Percent | 2.25 |
| Flash (Cleveland open cup) | °F | 560 |

Such a cylinder stock charging material is preferably subjected to propane treatment in the following manner:

The charging stock is mixed with propane and fed into a warm solution tank at a temperature of approximately 65° F. The cylinder stock propane solution is then transferred into a chiller and the pressure reduced until a temperature of the order of —20 to —54° F. is obtained depending upon the desired pour point of the ultimate oil product. The chilling is effected by evaporation of propane in the well recognized manner and make up propane is added during the chilling operation so that a ratio of propane to oil of approximately three to one prevails at the end of the chilling cycle and at the time of filtration.

When the cylinder stock-propane solution has been sufficiently chilled it is transferred to a filter feed tank and thence to an appropriate filter to secure separation of the wax from the chilled solution.

The propane-oil solution which has been freed from undissolved wax in the filter is then subjected to a precipitating treatment in which propane is added until the propane oil ratio is raised to approximately eight to one and the temperature of this solution is elevated to a temperature above 77° F. and preferably to a temperature of approximately the order of 155° to 165° F. which results in the precipitation of high molecular weight naturally contained viscous materials.

While in the above exemplification the solvent dewaxing is described as occurring in advance of the precipitation from the warm hydrocarbon solution it is desired to point out that the precipitation step may be effected in advance of dewaxing without materially modifying the character of the precipitate.

In fact in some instances the initial precipitation from the warm solvent solution may be preferred particularly where wax separation is effected by centrifuging. While we have referred to dewaxing in propane solution, it is to be understood that any type of solvent dewaxing process for the removal of precipitated wax may be used prior to the precipitation of viscous hydrocarbon materials from the warm propane solution in producing the source materials contemplated herein.

The precipitated material, separated from the warm propane solution either before or after dewaxing of the cylinder stock, may advantageously be subjected to further treatment to separate the same into relatively higher and lower viscosity materials and to separate such incidental bright stock as may have been carried down with the viscous precipitates.

Specifically when employing a warm propane solution of the paraffin base oil product having a temperature of the order of 160° F. the precipitate may be further separated into a series of different viscosity products by first adding propane and lowering the temperature to about 80° F. whereupon the higher viscosity materials separate i. e. those having a viscosity at 210° F. from 3000 to 5000 S. S. U. and thereafter progressively raising the temperature to approximately 160° F. with successive separation of materials ranging in viscosity from approximately 2000 S. S. U. at 210° F. down to approximately 400 S. S. U. at 210° F.

These thus produced naturally contained high molecular weight hydrocarbon materials that have been precipitated from a paraffin base oil constitute the source materials for producing the condensation products of the present invention. It is, of course to be understood that the like materials precipitated by two to four carbon atom hydrocarbon solvents other than propane are also comprehended herein.

In accordance with the present invention, the source materials derived in the manner above indicated are chemically condensed (which term is intended to embrace polymerization) in the presence of air while maintained at a controlled temperature below that at which thermal decomposition or flashing occur. The air blowing of these source materials results in an exothermic reaction thus rendering the process at least partially self-sustaining without application of further extraneous heat, although it may be necessary to add extraneous heat depending upon the source material being treated and the design of the particular vessel in which the air blowing operation is carried on. The rate of air blowing is so controlled as to maintain the temperature at approximately 475 to 575° F.

For purposes of illustration and not by way of limitation, the following illustrative examples are given:

EXAMPLE 1

In this example, a natural high molecular weight viscous hydrocarbon precipitate was derived from a paraffin base cylinder stock in the manner hereinabove outlined, and represents the heavier molecular weight portion separated from the overall warm propane solution precipitate at a temperature of approximately 80° F.

These natural occurring precipitated hydrocarbon materials have the following properties:

| | |
|---|---|
| Visc. S. S. U. at 210° F | 5250 |
| Penetration 100 g. total wt. (A. S. T. M. D5–25) cm.×10⁻² | Too soft to give a reading |
| Ball & ring softening point (A. S. T. M. D36–26) ° F | Below 80 |
| Molecular wt. (avg.) | 1380 |
| Iodine No. Wijs method | 57 |
| Carbon atoms per double bond (avg.) | 32 |

Starting with this source material the same was charged to a suitable apparatus for air blowing and initially heated to a temperature of approximately 500° F. accompanied by the introduction of air.

Care was exercised to avoid elevation of the temperature to a degree that would cause flashing. The air blowing in the instant example was conducted for approximately two hours with the temperature maintained within the range of from 480 to 500° F. This operation resulted in the production of a condensation product having the following characteristics:

| | |
|---|---|
| Visc. S. S. U. at 210° F | Too viscous for ready determination |
| Penetration 100 g. total wt. (A. S. T. M. D5–25) cm.×10⁻² | 101 |
| Ball & ring softening point (A. S. T. M. D36–26) ° F | 115 |
| Molecular weight (average) | 1900 |
| Iodine No. Wijs method | 41 |
| Carbon atoms per double bond (avg.) | 44 |

It is to be noted that this product possessed a lower iodine number, and a much higher molecular weight than did the source material from which it was derived by condensation in the presence of air.

EXAMPLE 2

In this example the same viscous source material was used as in Example 1. The air blowing was conducted under conditions similar to those in Example 1, except that the air blowing was continued for a period of approximately nine hours. The resulting condensation product was found to possess the following characteristics:

| | |
|---|---|
| Visc. S. S. U. at 210° F | Too viscous for ready determination |
| Penetration 100 g. total wt. (A. S. T. M. D5–25) cm.×10⁻² | 23 |
| Ball & ring softening point (A. S. T. M. D36–26) ° F | 218 |
| Molecular weight (average) | 2130 |
| Iodine No. Wijs method | 39 |
| Carbon atoms per double bond (avg.) | 46 |

EXAMPLE 3

The source material for this example differed somewhat from the source materials of Examples 1 and 2 in that it constituted a less viscous portion of the material which had been separated from the overall warm propane precipitate at a temperature of approximately 150° F. This less viscous source material had the following characteristics:

| | |
|---|---|
| Visc. S. S. U. at 210° F | 746 |
| Penetration 100 g. total wt. (A. S. T. M. D5–25) cm.×10⁻² | Too soft to give a reading |
| Ball & ring softening point (A. S. T. M. D36–26) ° F | Below 80 |
| Molecular weight (average) | 1090 |
| Iodine No. Wijs method | 43 |
| Carbon atoms per double bond (avg.) | 42 |

This viscous oil precipitate was subjected to air blowing in a manner comparable to that set forth in Example 1, with the exception that during the latter stages of the air blowing the temperature was caused to rise to approximately 520° F. and the air blowing was continued for approximately 15 hours. The resulting condensation product thus produced possessed the characteristics shown in the following table:

| | |
|---|---|
| Visc. S. S. U. at 210° F | Too viscous for ready determination |
| Penetration 100 g. total wt. (A. S. T. M. D5–25) cm.×10⁻² | 75 |
| Ball & ring softening point (A. S. T. M. D36–26) ° F | 147 |
| Molecular weight (average) | 1990 |
| Iodine No. Wijs method | 33 |
| Carbon atoms per double bond (avg.) | 55 |

EXAMPLE 4

The source material for this example constitutes a high molecular weight viscous material separated from propane precipitated wax by treatment of the wax with additional propane and precipitating the high molecular weight viscous hydrocarbons from the warm propane wax solution at a temperature of approximately 165° F. This source material had characteristics as follows:

| | |
|---|---|
| Visc. S. S. U. at 210° F | 543 |
| Penetration 100 g. total wt. (A. S. T. M. D5–25) cm.×10⁻² | Too soft to give a reading |
| Ball & ring softening point (A. S. T. M. D36–26) °F | 106 |
| Molecular wt. (average) | 1190 |
| Iodine No. Wijs method | 35.9 |
| Carbon atoms per double bond (avg.) | 51 |

This viscous source material derived from wax was air blown in a manner comparable to that set forth for Example 1 above, with the exception that in the latter stages of the air blowing, the temperature was caused to rise to approximately 570° F. and the blowing was continued for a period of approximately 22 hours, at which time the resulting product had characteristics as follows:

| | |
|---|---|
| Visc. S. S. U. at 210° F | Too viscous for ready determination |
| Penetration 100 g. total wt. (A. S. T. M. D5–25) cm.×10⁻² | 41 |
| Ball & ring softening point (A. S. T. M. D36–26) °F | 315 |
| Molecular wt. (average) | 2200 |
| Iodine No. Wijs method | 35.2 |
| Carbon atoms per double bond (avg.) | 52 |

It will be observed that the iodine number of each of the products is lower than the iodine number of the source material from which the product was produced. The molecular weight of each of these products is materially greater than that of the source material. The condensation products are definitely harder than the source materials from which they are produced as is clearly evidenced by the penetration data above indicated and they, likewise, have a substantially higher softening point as shown by the ball and ring test data.

In the illustrative examples, the condensation of the high molecular weight viscous materials in the presence of air was conducted in the absence of catalysts. It has been ascertained, however, that certain catalysts do accelerate the condensation reaction and their use is contemplated within the purview of this invention. Suitable catalysts are the metals and metal salts, more particularly, the naphthenates of metals capable of existing in two or more valences.

Time and temperature bear a definite correlation in effecting the chemical condensation of the present invention in that the higher the temperature the shorter the time and vice-versa, bearing in mind always the limitation that the temperature should be held below the flash point of the materials undergoing reaction.

The employment of catalysts has a direct bearing on the time and temperature correlation in that catalysts accelerate the chemical condensation reaction and permit of its being conducted at either a lower temperature or within a shorter time under the same temperature conditions prevailing in a non-catalyzed reaction.

The condensation products of the present invention show a marked reduction in susceptibility to penetration with temperature change in the range from 30 to 60° F. as shown in the following comparisons of the penetrations of the propane precipitated source material of Examples 1 and 2 above, and that of the condensation product of Example 2 above:

Penetration (A. S. T. M. D–5–25), $cm. \times 10^{-2}$

| Temp., °F. | Source material of Examples 1 and 2 (100 g. total weight) | Condensation product of Example 2 (200 g. total weight) |
|---|---|---|
| 30 | | |
| 40 | 86 | 19 |
| 50 | 174 | 21 |
| 60 | 206 | 24 |
| 70 | 302 | 26 |
| 80 | | 32 |
| 90 | | 39 |
| 100 | | 42 |
|  | | 61 |

As has been mentioned, the condensation products herein above described are substantially completely soluble in petroleum naphtha. An indication of their solubility in various solvents is set forth in the following table:

| Solvent | Boiling point | Percent solubility at room temperature | | | |
|---|---|---|---|---|---|
| | | Source material Examples 1 and 2 | Condensation product of Example 1 | Source material Example 3 | Condensation product Example 3 |
| | Degrees | | | | |
| Benzene | 79–81 | 100+ | 100+ | 100+ | 100+ |
| Toluene | 109–110 | 100+ | 100+ | 100+ | 100+ |
| Xylene | 135–140 | 100+ | 100+ | 100+ | 100+ |
| M. S. (Varnolene) | 295–305 | 100+ | 100+ | 100+ | 100+ |
| M. S. (Solvesso #2) | 135–177 | 100+ | 100+ | 100+ | 100+ |
| Turpentine | 150 | 100+ | 100+ | 100+ | 100+ |
| Chloroform | | 100+ | 100+ | 100+ | 100+ |
| Carbon tetra chl. | | 100+ | 100+ | 100+ | 100+ |
| Carbon disulfide | 46–47 | 100+ | 100+ | 100+ | 100+ |
| Ethyl ether | | 100+ | 100+ | 100+ | 100+ |
| i-Propyl ether | 67–69 | 100+ | 100+ | 100+ | 100+ |
| Amyl acetate | 110–150 | 100+ | 100+ | 100+ | 100+ |
| s-Butyl acetate | 104–130 | 24.6 | 15.2 | 100+ | 100+ |
| Methyl ethyl ketone | 78–81 | 7.7 | 5.6 | 100+ | 17.3 |
| Ethyl acetate | 77 | 4.3 | 3.7 | 7.8 | 6.0 |
| Butyl alcohol | 115–118 | 2.2 | 0.9 | 5.1 | 4.2 |
| Acetone | 56–57 | 1.8 | 1.3 | 4.3 | 0.9 |
| Furfural | | 1.6 | 0.8 | 1.7 | 1.3 |
| Ethyl alcohol | | 0.1 | 0.1 | 1.5 | 1.0 |
| | | | | 0.3 | 0.1 |

In all instances where solubility of the products of Examples 2 and 4 have been tested, they have shown the same general solubility characteristics as indicated for the products of Examples 1 and 3.

By reference to the foregoing solubility characteristics, it will be observed that the products of the present invention are highly soluble in the exemplary non-polar solvents while the solubility in the polar solvents is in most instances very low. It will also be seen by reference to these solubility characteristics that, in general, the solubilities in the polar solvents of the products produced by the herein described operation are less than the solubilities of the source materials in such solvents.

The solubility characteristics support the belief that the source materials and the condensation products thereof are non-polar in nature, as indicated by the fact that they are, in general, more soluble in the non-polar solvents and less soluble in the polar solvents. The molecular structure of the source materials and the condensation products resulting therefrom, i. e., the high molecular weight hydrocarbon materials, also confirm the belief that these materials are, generally speaking, non-polar.

While the illustrative examples above given have set forth the application of the present invention to certain specific components of the overall viscous material precipitated from a warm propane solution of a paraffin base oil product, it is to be understood that the invention is equally applicable to any of the analogous viscous components precipitated from a warm two to four carbon atom hydrocarbon solvent solution of a paraffin base oil product that has undergone no thermal decomposition or chemical change other than occasioned by ordinary distillation. In fact, precipitated viscous materials having a viscosity varying from approximately 300 seconds Saybolt Universal at 210° F. to several thousand seconds Saybolt Universal at 210° F. have been processed in accordance with the present invention to produce condensation products.

By reference to these specific examples, it will be observed that by appropriately selecting the precipitated source material that is to be chemically condensed in the presence of air and by further controlling the time and temperature conditions of such condensation, a series of products possessing varying characteristics may be obtained.

In this way it is possible to produce a chemical condensation product meeting almost any demand. Additional variation and modification of the ultimate product may be had by combining or blending together two or more of the condensation products produced by condensation of different components separated from the overall precipitate.

It will thus be observed that the process and the nature of the products produced are rendered highly flexible and adaptable.

The novel chemical condensation products of the present invention are fire resistant, water proof, and weather resistant. They are additionally acid and alkali resistant, and possess a high degree of flexibility and toughness. They are both cohesive and adhesive, and retain these properties throughout a wide range of temperature conditions. They are compatible with a large number of materials, e. g. gilsonite, coal tar pitch, phenolformaldehyde resins, coumarone-indene resins, drying oils, rubber, synthetic rubbers, and the like. They thus constitute highly valuable materials for a wide variety of industrial uses.

Having thus described the invention, what is claimed as new is:

1. A chemical condensation product derived from a naturally contained high molecular weight viscous material precipitated from a warm propane solution of a residual paraffin base oil fraction which has undergone no thermal decomposition or chemical change beyond that induced by ordinary fractional distillation, said chemical condensation product having an iodine number not substantially above 40, a ball and ring softening point above 110° F., an average molecular weight of at least 1900, at least 40 carbon atoms per double bond, and a marked reduction in susceptibility to penetration with temperature change in the range of from 30 to 60° F., and being substantially completely soluble in 88° Baumé naphtha.

2. A chemical condensation product derived from a naturally contained high molecular weight viscous material percipitated from a warm propane solution of a residual paraffin base oil fraction which has undergone no thermal decomposition or chemical change beyond that induced by ordinary fractional distillation, said chemical condensation product having an iodine number not substantially above 40, a ball and ring softening point above 200° F., an average molecular weight of at least 2000, and over 40 carbon atoms per double bond, and being substantially completely soluble in 88° Baumé naphtha.

3. A chemical condensation product derived from a naturally contained high molecular weight viscous material precipitated from a warm normally gaseous hydrocarbon solvent solution of a residual paraffin base oil fraction which has undergone no thermal decomposition or chemical change beyond that induced by ordinary fractional distillation, said chemical condensation product having an iodine number not substantially above 40, a ball and ring softening point above 110° F., an average molecular weight of at least 1900, at least 40 carbon atoms per double bond, and a marked reduction in susceptibility to penetration with temperature change in the range of from 30 to 60° F., and being substantially completely soluble in 88° Baumé naphtha.

WILBERT B. McCLUER.
RALPH W. HUFFERD.